(12) United States Patent
Stucki

(10) Patent No.: US 7,931,720 B2
(45) Date of Patent: Apr. 26, 2011

(54) WATER SEPARATOR FOR A STEAM TURBINE PLANT

(75) Inventor: Christian Peter Stucki, Zurich (CH)

(73) Assignee: ALSTOM Technology Ltd., Baden (CH)

( * ) Notice: Subject to any disclaimer, the term of this patent is extended or adjusted under 35 U.S.C. 154(b) by 279 days.

(21) Appl. No.: 12/398,372

(22) Filed: Mar. 5, 2009

(65) Prior Publication Data
US 2009/0235622 A1    Sep. 24, 2009

Related U.S. Application Data

(63) Continuation of application No. PCT/EP2007/058634, filed on Aug. 20, 2007.

(30) Foreign Application Priority Data

Sep. 19, 2006  (CH) ...................... 1493/06

(51) Int. Cl.
B01D 49/00 (2006.01)
(52) U.S. Cl. ........ 55/396; 55/414; 55/DIG. 23; 415/115
(58) Field of Classification Search ............ 55/319, 55/396, 414, 418, DIG. 23; 415/115
See application file for complete search history.

(56) References Cited

U.S. PATENT DOCUMENTS

| | | | |
|---|---|---|---|
| 2,857,980 A | 10/1958 | Rossum | |
| 3,925,045 A | 12/1975 | Cheng | |
| 4,681,610 A | 7/1987 | Warner | |
| 4,738,585 A * | 4/1988 | von Bockh | 415/115 |

FOREIGN PATENT DOCUMENTS

| | | |
|---|---|---|
| DE | 2526989 | 1/1976 |
| EP | 0048508 | 3/1982 |
| EP | 0096916 | 12/1983 |
| EP | 0158891 | 10/1985 |
| EP | 0233332 | 8/1987 |
| EP | 0885585 | 12/1998 |
| EP | 1621243 | 2/2006 |
| FR | 2558741 | 2/1985 |

(Continued)

OTHER PUBLICATIONS

"Betriebserfahrungen mit neuen Vor- und Hochgeschwindigkeits-abscheidern," ABB Review, 1990, vol. 3, pp. S3-S10, ABB Technik, Germany.

(Continued)

Primary Examiner — Robert A Hopkins
(74) Attorney, Agent, or Firm — Cermak Nakajima LLP; Adam J. Cermak

(57) ABSTRACT

A water preseparator (1) for steam turbine plants for the separation of water from the operating steam ($S_W$) from a high-pressure steam turbine has a feed pipe (2) which extends over the starting section of a steam transfer pipe (4), wherein the two pipes are separated from each other by a gap (11) through which water (12) together with transporting steam (St) flow into a housing. The water discharges from the preseparator (1) via a water discharge pipe (6). the preseparator has structure for recycling of the transporting steam into the operating steam of the steam turbine plant, wherein this recycling structure has built-in fittings or a baffle (9) of the transporting steam, and also structure (4) for achieving a pressure drop, wherein the pressure drop exists between the gap (11) and a point at which the transporting steam is reintroduced into the operating steam ($S_W$).

3 Claims, 2 Drawing Sheets

FOREIGN PATENT DOCUMENTS

WO    WO2008034681    3/2008

OTHER PUBLICATIONS

Search Report for Swiss Patent App. No. 1493/2006 (Jan. 9, 2007).

International Search Report for PCT Patent App. No. PCT/EP2007/058634 (Dec. 11, 2007).

International Preliminary Examination Report for PCT Patent App. No. PCT/EP2007/058634 (Aug. 2, 2008).

\* cited by examiner

WATER SEPARATOR FOR A STEAM TURBINE PLANT

This application is a Continuation of, and claims priority under 35 U.S.C. §120 to, International Application No. PCT/EP2007/058634, filed 20 Aug. 2007, and claims priority therethrough under 35 U.S.C. §§119, 365 to Swiss application no. 01493/06, filed 19 Sep. 2006, the entireties of both of which are incorporated by reference herein.

BACKGROUND

1. Field of Endeavor

The invention relates to a water separator for steam turbine plants, especially to a preseparator.

2. Brief Description of the Related Art

During the transfer of operating steam from a high-pressure steam turbine into a low-pressure steam turbine, the operating steam is preferably directed through a high-velocity water separator. The separation of water from the operating steam before its reintroduction into the low-pressure steam turbine serves for reducing erosion damage on the turbine blading. In a high-velocity water separator, the separation takes place directly in the transfer pipe, wherein the steam maintains its flow velocity and does not pass through any deviations as a result of complex and large separator components in which the steam velocity is lower.

In the prior art, a distinction is made between preseparators, or water preseparators, and high-velocity water separators, wherein essentially the two achieve a water separation from the operating steam of a turbine while maintaining the high velocity of the steam in the pipe of about 50-70 m/s. A preseparator according to the prior art includes a housing which encloses a crossover, which is designed for separation, from an exhaust steam pipe to a steam transfer pipe. A high-velocity water separator according to the prior art includes a pipe bend in a steam transfer pipe, in which deflecting vanes with openings are arranged, which serve for the discharge of water via the vane interior.

A preseparator is disclosed for example in ABB review 3/1990, pages 3-10, "Operating experiences with new pre- and high-velocity separators". The exhaust steam from a high-pressure steam turbine flows via an exhaust steam housing into a steam transfer pipe which guides the steam into the low-pressure steam turbine. The preseparator is arranged in a housing which encloses a part of the exhaust steam housing and the starting section of the steam transfer pipe, and has a discharge pipe. The exhaust steam pipe encloses the starting section of the steam transfer pipe, wherein an annular gap exists between the two pipes. A water film, which has been formed from the exhaust steam, flows down along the inside wall of the exhaust steam housing and through the annular gap between the exhaust steam housing and the steam transfer pipe, wherein the discharge of the water is assisted by a steam flow, often also referred to as a transporting steam flow, for the purpose of avoiding a build-up of water at the gap. The water then leaves the separator via the discharge pipe and is fed to a further part of the steam turbine plant. The transporting steam flow is guided via a further steam pipe from the separator and is also fed to a suitable part of the steam turbine plant.

In the same document, a high-velocity water separator is also disclosed which includes a pipe bend in the steam transfer pipe, wherein, on deflecting vanes in the pipe bend, water separation is achieved by openings on the vanes. In this case, a mixture of water and transporting steam flows into the interior of the vanes and is guided into a cavity in which the water is separated from the transporting steam. The water and the transporting steam leave the separator via separate pipes and are fed to further plant components, for example to preheaters.

In both of these separators, the costs of the pipe construction which is necessary for the discharge of transporting steam amount to a significant part of the overall costs of the water separator.

A further high-velocity water separator is known from EP 233 332. The steam transfer pipe again has a pipe bend or a pipe elbow there, in which a number of deflecting vanes are arranged. On the concave side of the deflecting vanes, openings and also associated shrouds are attached, which serve for the discharge of water films which are formed on the vanes. The water in this case is guided via the interior of the vanes into a water discharge pipe, removed from the separator, and fed to a further part of the plant. Transporting steam, which by the deflecting vanes is also entrained through the openings into the interior of the vanes, is fed again to the operating steam in the steam transfer pipe by deflection baffles in the interior of the vanes and by a discharge opening on the convex side of the vanes. A separation of transporting steam and water is achieved in the interior of the vanes as a result.

SUMMARY

One of numerous aspects of the present invention includes a preseparator or water preseparator for steam turbine plants which can maintain the (high) velocity of the steam from the exhaust steam housing of a high-pressure steam turbine, which separator in comparison to the separators of the prior art requires a smaller pipe construction and can be installed at lower costs and with lower operating expenditure, especially in the case of retrofits of existing plants.

A water preseparator for steam turbine plants for the water separation of water from the operating steam from a high-pressure steam turbine, while maintaining the high velocity of the steam, is arranged in a steam transfer pipe between a high-pressure steam turbine and a low-pressure steam turbine. The water preseparator has a feed pipe for the operating steam from the exhaust steam housing of the high-pressure turbine, which extends over the starting section of the steam transfer pipe, wherein the two pipes are separated from each other by a gap through which water together with transporting steam flow into a housing. The housing encloses the end section of the feed pipe and a part of the steam transfer pipe and has a water discharge pipe. According other aspects of the invention, the water preseparator has means for recycling the transporting steam into the operating steam of the steam turbine plant, wherein this means for recycling has built-in fittings or a baffle for deflection of the transporting steam, and also means for achieving a pressure drop, wherein the pressure drop exists between the start of the gap between feed pipe and steam transfer pipe and a point at which the transporting steam is reintroduced into the operating steam.

In a first embodiment, the steam transfer pipe, in its starting section, has an inflow section with a constriction in the flow direction, wherein the constricting inflow section at its end has a cross section which is smaller than the cross section of the steam transfer pipe, and the inflow section projects into the steam transfer pipe, and between the inflow section and the steam transfer pipe a gap exists, through which a fluid can flow. The inflow section is fastened on the inside wall of the steam transfer pipe, wherein the fastening extends only over parts of the circumference so that the fluid flow through the gap is ensured. In addition, the inflow section on its outer side has a baffle or a built-in fitting which extends in the flow direction from the start of the inflow section, widening in cross section over the start of the steam transfer pipe.

In the water preseparator in this embodiment, as in the separators of the prior art, a water film is formed on the wall of the feed pipe. This water flows down through the gap between feed pipe and the inflow section of the steam transfer pipe, wherein this water flow is assisted by a transporting steam flow for the purpose of avoiding a build-up of water at the gap. The transporting steam flows through the gap and then along the built-in fittings outside the steam transfer pipe, first of all in the flow direction of the operating steam. The transporting steam then flows with a sharp change of direction around the end of the built-in fittings, wherein water in the transporting flow drops downwards on account of its inertia and is separated from the transporting steam. After the deflection, the transporting steam reaches the start of the steam transfer pipe and, after a further deflection, enters the steam transfer pipe there through the gap between inflow section and steam transfer pipe. The constriction of the inflow section of the steam transfer pipe achieves the effect of a Venturi-nozzle by an underpressure being formed in the inflow section in the steam transfer pipe, which forces the flow of transporting steam around the baffle into the steam transfer pipe. As a result, a recycling of the transporting steam, which is diverted from the operating steam in the feed pipe, is achieved back into the operating steam in the steam transfer pipe.

In a second embodiment of the water preseparator or preseparator according to the invention, the steam transfer pipe has a bend in which a plurality of deflecting vanes are arranged. The housing of the preseparator encloses this curved section of the steam transfer pipe. In the interior space of the housing and outside the feed pipe, the preseparator additionally has duct-like built-in fittings or a duct-like baffle which extends from a level above the end of the feed pipe to the steam transfer pipe downstream of its bend. Finally, on a plane below the end of the feed pipe a water collecting plate is arranged with an opening for the discharge of water to the discharge pipe in the housing.

As in the preseparator of the first embodiment, water from the operating steam flows from the high-pressure turbine along the inside wall of the feed pipe and passes through the gap between feed pipe and steam transfer pipe, wherein the water flow is assisted by transporting steam. At the end of the feed pipe, the transporting steam is deflected around the end of the feed pipe, flows from there to the opening of the duct-like baffle and passes through this duct back into the operating steam in the steam transfer pipe. The deflection is enforced by a pressure drop between the start of the steam transfer pipe and the return point of the transporting steam by the duct-like baffle into the steam transfer pipe, which is created as a result of the bend in the steam transfer pipe.

By implementation of embodiments according to the invention, the requirement of a transporting steam pipe from the separator housing into a further part of the steam turbine plant, as was necessary in plants of the prior art, can be dispensed with. The consumption of labor and costs which is associated with it is therefore avoided. Since in the case of preseparators of the prior art, the construction of such pipes typically constitutes a significant part of the construction costs of the entire separator, this measure signifies an appreciable cost reduction. The construction and especially a retrofit of a preseparator according to the invention can consequently be realized in a greatly simplified and more cost-effective manner.

DETAILED DESCRIPTION OF EXEMPLARY EMBODIMENTS

Figure 1:
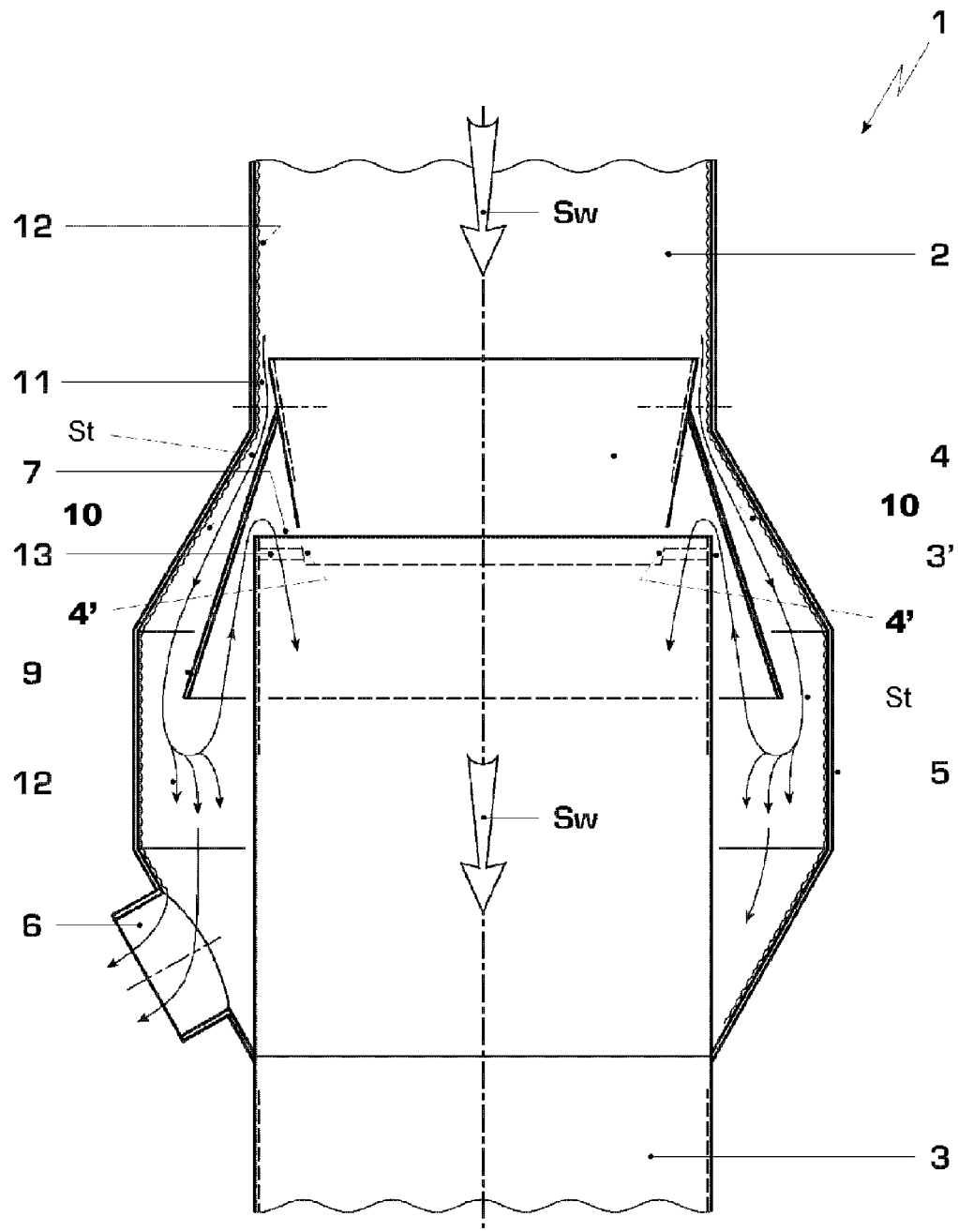
FIG. 1 shows a first embodiment of the preseparator according to the invention.

FIG. 1 shows an example of a preseparator 1 according to the first embodiment. A feed pipe 2 is shown, through which the steam from the exhaust steam housing of a high-pressure steam turbine flows in the direction of the arrow $S_W$, and reaches a steam transfer pipe 3 with an inflow section 4 which is enclosed by the end of the feed pipe 2. The steam transfer pipe finally leads from the preseparator into a low-pressure steam turbine. The separator has a housing 5 which, starting from the end of the feed pipe, encloses the steam transfer pipe 3, and on a lower section has a water discharge pipe 6. The inflow section 4 of the steam transfer pipe has a constriction of the cross section in the flow direction $S_W$, as a result of which the end 4' with the smaller cross section projects into the starting section of the steam transfer pipe. Between the end 4' of the inflow section 4 and the beginning 3' of the steam transfer pipe there is a gap 7 through which steam can flow. For this purpose, the fastening of the inflow section 4 on the steam transfer pipe 3, for example by ribs 13, is designed so that this extends only over parts of the circumference and ensures a steam flow through the gap 7. A baffle or built-in fittings 9, which extend(s) in the flow direction $S_W$ over the starting section 3' of the steam transfer pipe 3, are fastened on the outside wall of the inflow section 3 of the steam transfer pipe.

On the inside wall of the feed pipe 2, a film 10 of water from the operating steam from the high-pressure steam turbine is formed. This water film 10 flows through a gap 11 between the feed pipe 2 and the inflow section 4. This water flows down along the inside wall of the housing 5 and leaves the separator 1 via the discharge pipe 6.

A water flow 11, which flows through the gap 7 according to the arrow direction, is assisted by a steam flow St, which is also referred to as transporting steam St. As a result, a build-up of water and a flow vortex at the gap are avoided. The transporting steam St flows between housing 5 and the baffle 9 and is deflected around the end of the baffle 9. During the sharp deflection, however, the greater part of the water 12 which is contained within the transporting steam drops downwards, with which a phase separation takes place. The transporting steam then flows in the opposite direction to the starting section of the steam transfer pipe 3 and is again deflected there. From there, the transporting steam, via the gap 7, reaches the operating steam $S_W$ in the steam transfer pipe 3, with which the recycling of the transporting steam is achieved.

The constriction in the inflow section aims at an acceleration of the steam flow and, therefore, based on the principle of a Venturi-nozzle, aims at the enforcing of an underpressure in the steam transfer pipe in the region of the inflow section. The pressure drop which consequently results between the point of the outflow of the transporting steam from the operating steam flow and the region of the underpressure enables the return flow of the transporting steam via the baffle 9 and the gap 7.

Figure 2:
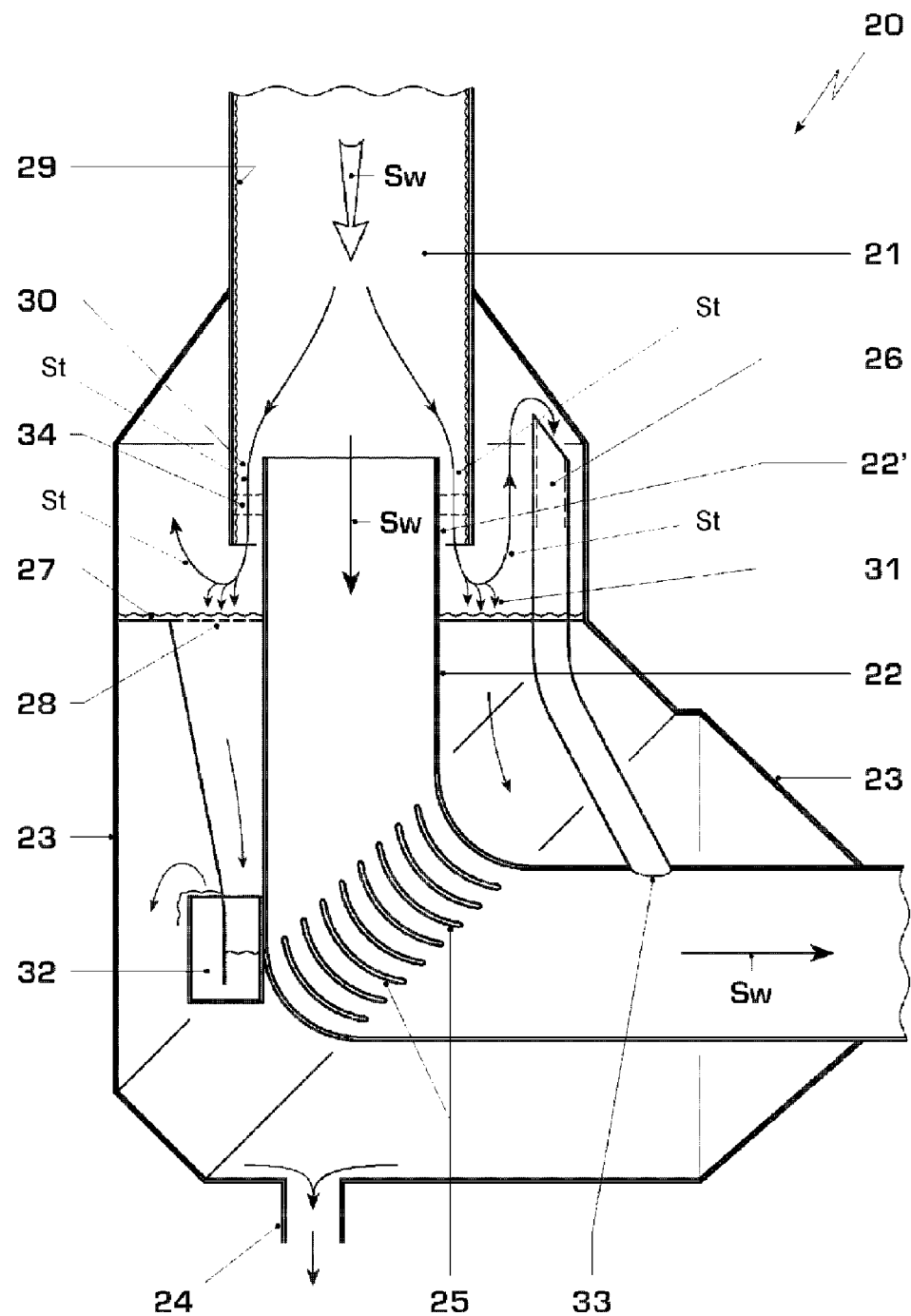
FIG. 2 shows a second embodiment of the preseparator according to the invention.

FIG. 2 shows an example of a preseparator 20 according to the second embodiment. A feed pipe 21 is again shown, through which operating steam $S_W$ from a high-pressure steam turbine flows in the direction of the arrow $S_W$ and reaches a steam transfer pipe 22 which is enclosed by the end of the feed pipe 21. The steam transfer pipe 22 finally leads from the preseparator into a (not shown) low-pressure steam turbine. Between the two pipes 21 and 22, there is a gap 30. In the gap 30, in one variant, a plurality of ribs 34 are arranged distributed over the circumference of the pipes 22 and 21. The separator has a housing 23 which, starting from the end of the feed pipe 21, encloses the steam transfer pipe 22 over a specified length together with a bend, and in a lower region has a water discharge pipe 24. The steam transfer pipe includes a bend of, for example, 90°, wherein a multiplicity of deflecting vanes 25 are arranged in the bend. A duct-like baffle 26 is arranged in the housing 23 and begins in a plane above the starting section 22' of the steam transfer pipe 22, extends downwards, and at an entry point 33 into the steam transfer pipe 22 leads into the steam transfer pipe downstream of its bend.

On the inside wall of the feed pipe 21, a film 29 of water from the operating steam of the high-pressure steam turbine is formed and flows through the gap 30, wherein the transporting steam flow St promotes a uniform, vortex-free water flow. After flowing through the gap 30, the transporting steam flow St flows around the end of the feed pipe 22 and reaches upwards to the inlet opening of the duct-like, for example tubular, baffle 26. The transporting steam reaches the steam transfer pipe 22 via the baffle 26 at the opening point 33.

As a result of the deflection of the steam flow in the steam transfer pipe by the bend, a pressure drop exists between the point of outflow of the transporting steam from the operating steam flow and a point downstream of the bend, such as for example at the opening point of the baffle 26. As a result of the pressure drop, the return flow or recycling of the transporting steam into the operating steam flow is enforced.

During circumflowing of the end of the feed pipe 22, the water 31 which is contained within the transporting steam is separated out and drops downwards into the lower region of the housing 23 with the discharge pipe 24. In order to optimize the discharging of the water, a water collecting plate 27 is arranged annularly around the steam transfer pipe 22 and on a plane below the end of the feed pipe 21. The water collecting plate has one or more openings 28 through which the collected water reaches the lower part of the housing 23 and finally discharges from the separator via the water discharge pipe 24. For stabilizing the discharging water flow, for example a siphon 32 is additionally arranged.

LIST OF DESIGNATIONS

1 Water preseparator
2 Feed pipe
3 Steam transfer pipe
3' Starting section of the steam transfer pipe
4 Inflow section
4' End section of the inflow section
5 Housing
6 Water discharge pipe
7 Gap
9 Built-in fittings, baffle
10 Water film
11 Gap
12 Water
13 Rib
$S_W$ Operating steam
St Transporting steam
20 Water preseparator
21 Feed pipe
22 Steam transfer pipe
23 Housing
24 Water discharge pipe
25 Deflecting vanes
26 Duct-like baffle
27 Water collecting plate
28 Opening
29 Water film
30 Gap
31 Water
32 Siphon
33 Opening into steam transfer pipe
34 Rib While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A water preseparator for steam turbine plants for water separation of water from the operating steam with a flow direction from a high-pressure steam turbine to a low-pressure steam turbine, the high-pressure steam turbine including an exhaust steam housing, the preseparator comprising:
   a steam transfer pipe configured and arranged to conduct operating steam between the high-pressure steam turbine and the low-pressure steam turbine, wherein the steam transfer pipe includes a starting section and a bend including a multiplicity of deflecting vanes;
   a feed pipe configured and arranged to receive operating steam from the exhaust steam housing of the high-pressure steam turbine, wherein the feed pipe includes an end section which extends over the starting section of the steam transfer pipe;
   a housing having an interior space enclosing the feed pipe end section and the steam transfer pipe bend, the housing including a water discharge pipe;
   wherein the feed pipe is separated from the steam transfer pipe by a gap through which water and transporting steam can flow into the housing; and at least one duct in the housing interior space and outside the feed pipe, the at least one duct having an inlet opening offset from the flow direction of the operating steam relative to the feed pipe end section, and the at least one duct extending to at least one location in the steam transfer pipe downstream of said bend and leading into the steam transfer pipe such that transporting steam flowing through the at least one duct joins the operating steam in the steam transfer pipe downstream of said bend, and wherein a pressure drop exists between the gap and said at least one location.

2. The water preseparator as claimed in claim 1, further comprising:
a water collecting plate having at least one opening configured and arranged to discharge water to the discharge pipe in the housing, the plate being arranged on a plane below the end of the feed pipe.

3. The water preseparator as claimed in claim 2, further comprising:
a siphon arranged in the housing configured and arranged to collect water when flowing through the openings in the water collecting plate.

* * * * *